*Inventor*
SIDNEY R. HAINES
By *J. L. Sterling*
*Attorney*

Aug. 19, 1952

S. R. HAINES 2,607,527

TOTAL-TAKING CONTROL MECHANISM FOR RECORD
CARD CONTROLLED STATISTICAL MACHINES

Filed Nov. 7, 1950

*Inventor*
SIDNEY R. HAINES

By *J.L. Sterling*

*Attorney*

Patented Aug. 19, 1952

2,607,527

UNITED STATES PATENT OFFICE 2,607,527

TOTAL-TAKING CONTROL MECHANISM FOR RECORD CARD CONTROLLED STATISTICAL MACHINES

Sidney Robert Haines, West Norwood, London, England, assignor to Powers-Samas Accounting Machines Limited, London, England, a British company Application November 7, 1950, Serial No. 194,457
In Great Britain November 8, 1949

10 Claims. (Cl. 235—61.6)

This invention relates to record card controlled statistical machines and in particular to machines of the kind provided with means for sensing cards and for transmitting the items sensed to an accumulator, and has for its main object to increase the flexibility of control of such machines.

In machines of the kind mentioned it is usual to provide a total-taking shaft which controls the taking of a total from the accumulator and a total-taking cycle has in such machines been initiated in a number of ways such for example as by sensing means detecting a change of designation. With the previously employed means for initiating a total-taking cycle by a card control it has been necessary to employ a single selected card field, such as the designation field, for the purpose of controlling the initiating of a total-taking cycle and it is an object of the invention to provide a selectively operable control device to initiate a total-taking cycle, such device being capable of control from a total-taking control hole provided in a selected card field. To this end the control device according to the invention is operated by a selected one of the transmission elements included in a connection box disposed between the sensing means and the transmission means for transmitting to the accumulator items sensed from a card. The selected transmission element can be connected for actuation by any desired sensing pin in the pin box adapted to sense record cards and the total-taking control hole can be provided in a card from which is sensed an item for inclusion in the accumulator or in a card which contains only a total-taking control hole, the hole being located in any selected card field.

Accordingly the invention comprises a record card controlled statistical machine including the combination with a reciprocating pin box for sensing record cards, an accumulator, transmission means including a connection box containing transmission elements actuated by the pins of the pin box to transmit to said accumulator items sensed by pins of the pin box for accumulation in the accumulator, and means to initiate the operation of a total-taking shaft to effect the taking of a total from the accumulator, of selectively operable control means adapted for actuation by a selected one of said transmission elements on the sensing of a total-taking control hole in a record card to initiate a cycle of the total-taking shaft.

In some kinds of machine such for example as that described in United States specification No. 2,496,138 it has been customary to clear or zeroise the accumulator when a total is taken therefrom and it is a further object of the present invention to provide means whereby the clearing of the accumulator can be automatically and selectively prevented so that one or more sub- or progressive-totals can be taken from the accumulator and the accumulator cleared or zeroised only on receipt of a signal that a total-taking cycle is also to effect clearing of the accumulator.

Accordingly the invention also comprises a record card controlled statistical machine including the combination with a reciprocating pin box for sensing record cards, an accumulator, transmission means including a connection box containing transmission elements actuated by the pins of the pin box to transmit to said accumulator items sensed by the pins of the pin box for accumulation in the accumulator, means operative during a total-taking cycle of the machine to zeroise the accumulator, and means to initiate the operation of a total-taking shaft to effect the taking of a total from the accumulator, of selectively operable control means adapted for actuation by a selected one of said transmission elements on the sensing of a predetermined total-taking control hole in a record card to initiate a cycle of the total-taking shaft, interrupter means to prevent the actuation of said zeroising means during a total-taking cycle, and a trip device operable as the result of a signal received from said pin box to condition the interrupter means to permit zeroising of the accumulator during the total-taking cycle next succeeding the conditioning of the interrupter means.

In order that the invention may be more clearly understood an embodiment thereof will be described, by way of example, with reference to the accompanying diagrammatic drawings, in which.

Some of the machine about to be described is similar to that described in the said specification No. 2,496,138, and where possible the reference numerals used herein will correspoind to those used in the said specification to identify like or similar elements, the new elements described herein will be identified by reference numerals 401 and upwards.

The machine described in specification No. 2,496,138, is primarily constructed for cross adding, that is, for effecting the successive sensing of a plurality of fields in a single card and adding the items thus individually sensed into the accumulator, a total usually being taken when each of the items from an individual card has been transmitted to the accumulator. The machine described in the aforesaid specification can, however, be conditioned for tabulating, that is the machine may be conditioned to sense one field only from each of a number of successive record cards, the items from the individual record cards being each transmitted to the accumulator and a total taken from the accumulator only when each of the items has been transmitted to the accumulator.

Figure 1A:
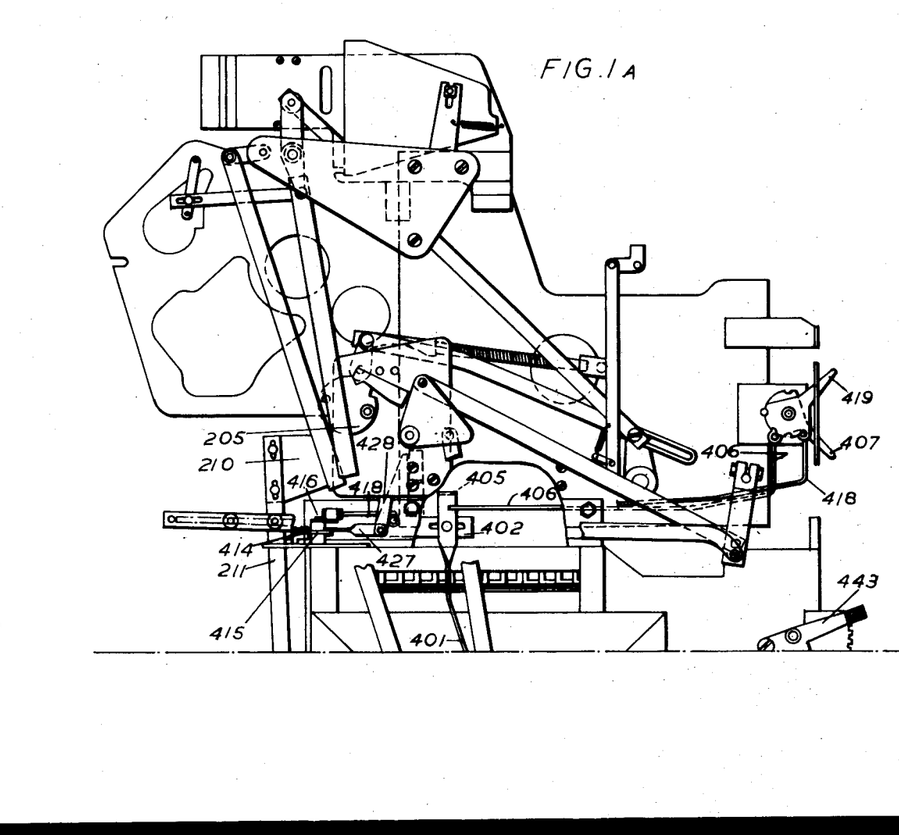
Figures 1A and 1B together form an outside left-hand elevation of the machine.
Figure 1B:
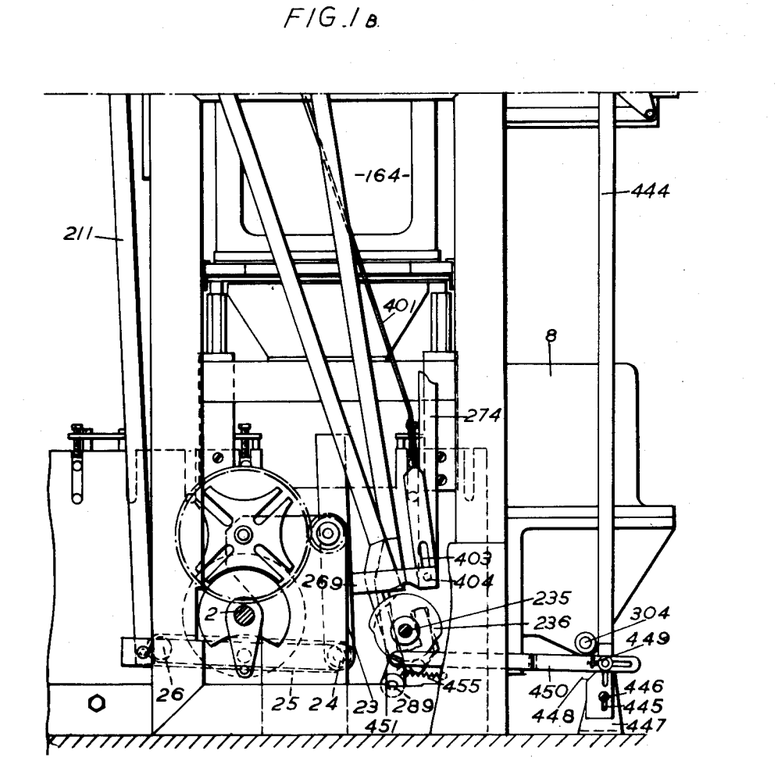

Referring to the drawings, the machine comprises a base section 1, Figure 1B, housing a main shaft 2 which is continuously driven from an electric motor, not shown.

Figure 2A:
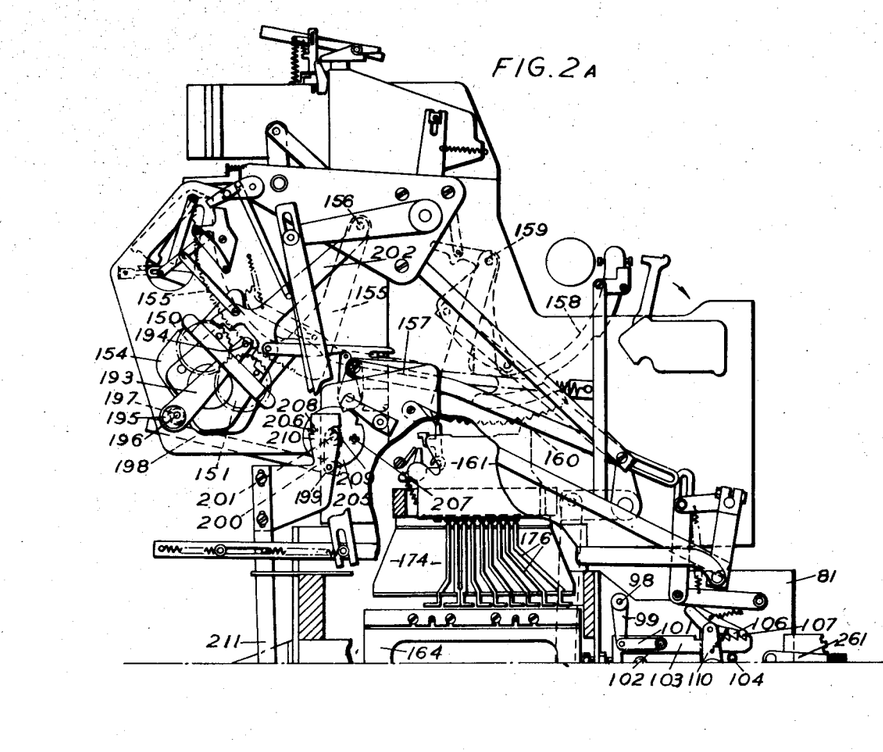
Figures 2A and 2B together show the machines in left-hand elevation with certain parts removed to show others behind them.
Figure 2B:
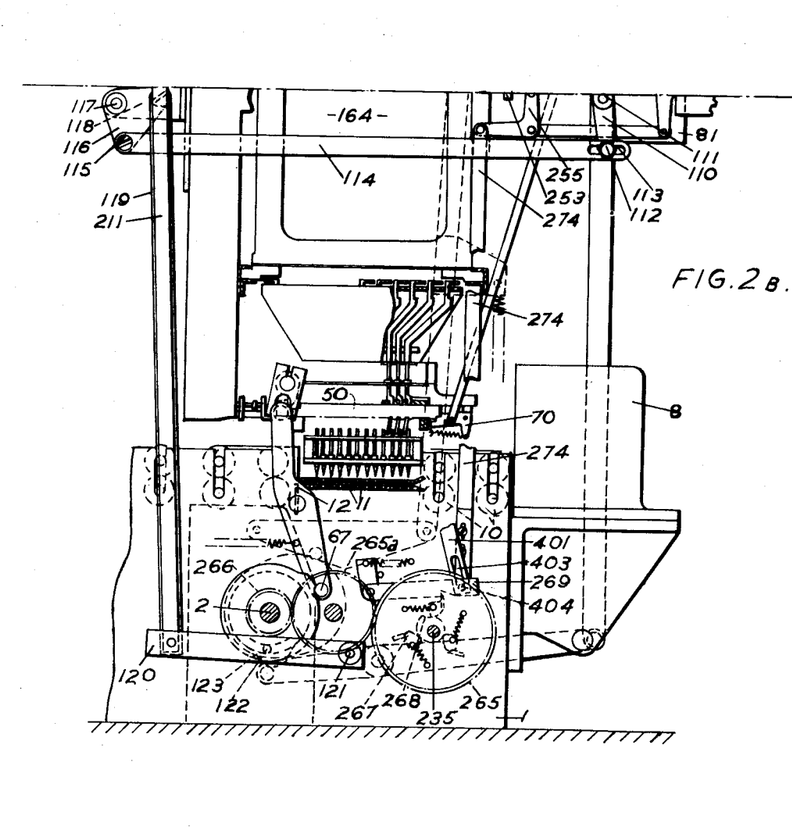
Figure 3:
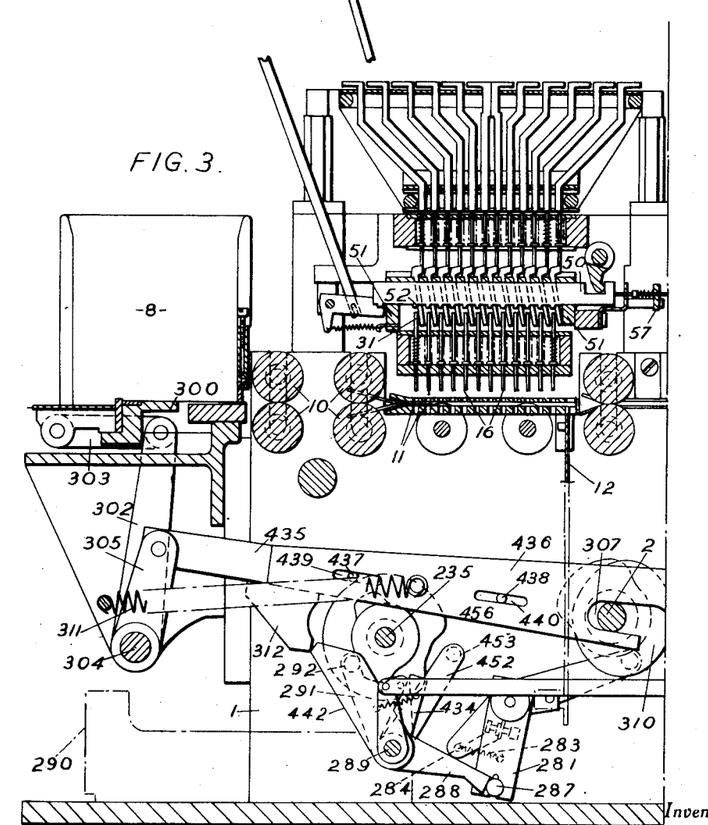
Figure 3 is a vertical section of the base mechanism of the machine to a larger scale.
Figure 11:
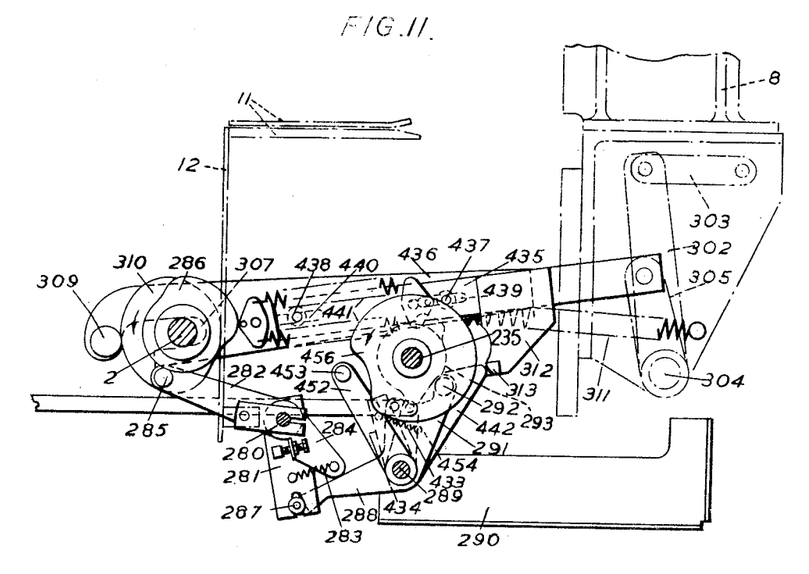
Figure 11 is an elevation of the card stop and card picker control mechanism.

Mounted in the base section is a card magazine 8 from which the cards are fed seriatim by a picker, not shown, to feed rolls 10, Figure 3, which convey each card in turn between fixed sensing pin plates 11 between which it is arrested by a card stop 12, Figures 2B, 3 and 11.

The sensing pin box is of the general construction described in United Kingdom specification No. 401,012 or in United States specification No. 2,290,827 and is driven in the manner described in the last mentioned specification.

The pin box is constructed as described in the aforesaid specification No. 2,496,138 and is operated in the manner described in United States specification No. 2,290,827 by means of a link 23 (similar to the link 22 in specification No. 2,290,827) this link being pivoted at its lower end 24 to an arm 25 pivoted to the base of the machine at 26.

A shutter 50, Figure 3, individual to each column of sensing pins is provided and each of these shutters is in the form of a slide mounted at each end in comb bars 57 carrying a series of lugs 52 each engaging one of the intermediate elements 31 of the associated column. The operation of the shutters and the restoring thereof is as described in specification No. 2,496,138 and it is, therefore, not considered necessary further to describe the operation of these elements herein.

As is described in specification No. 2,496,138, by controlling the operation of the shutters 50, sensing of a card can be effected either in one stage or in a plurality of successive stages. In the latter instance two or more vertical fields of a card may be sensed in predetermined order.

Figure 4:
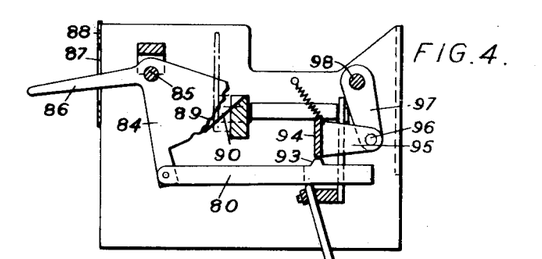
Figure 4 is a section showing the mechanism for controlling the order in which fields of the cards are sensed.
Figure 7:
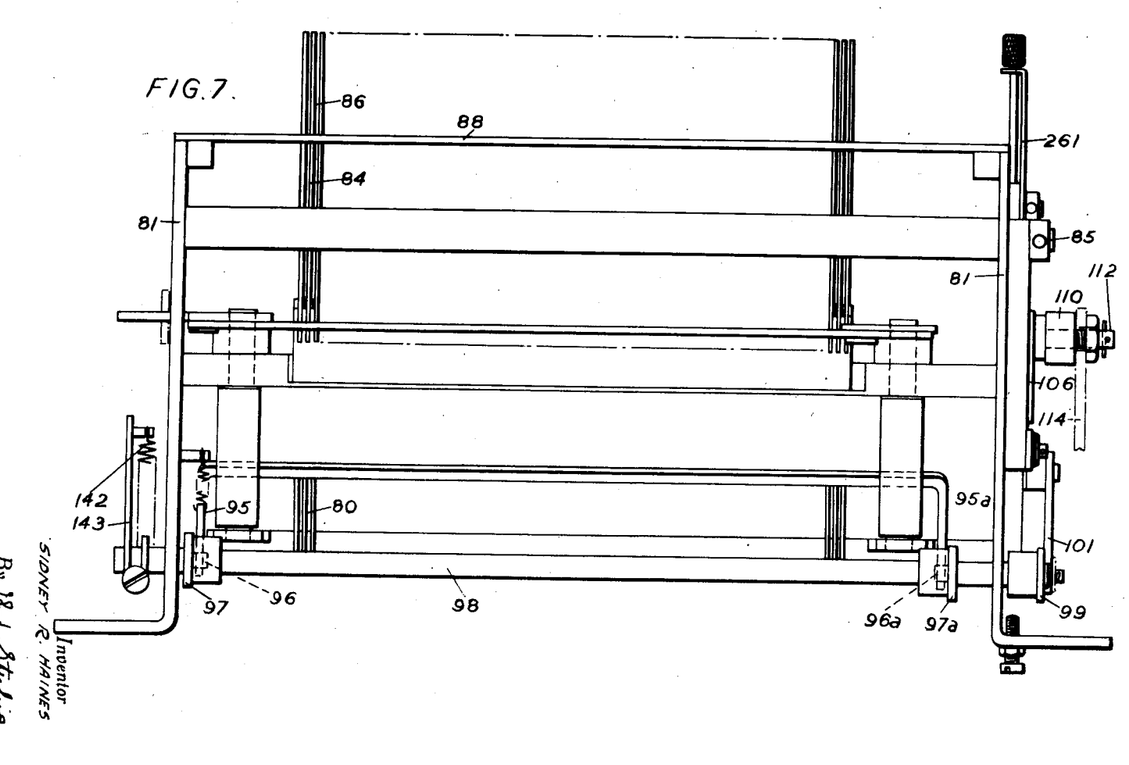
Figure 7 is a plan of the mechanism shown in Figures 5 and 6.
Figure 8:
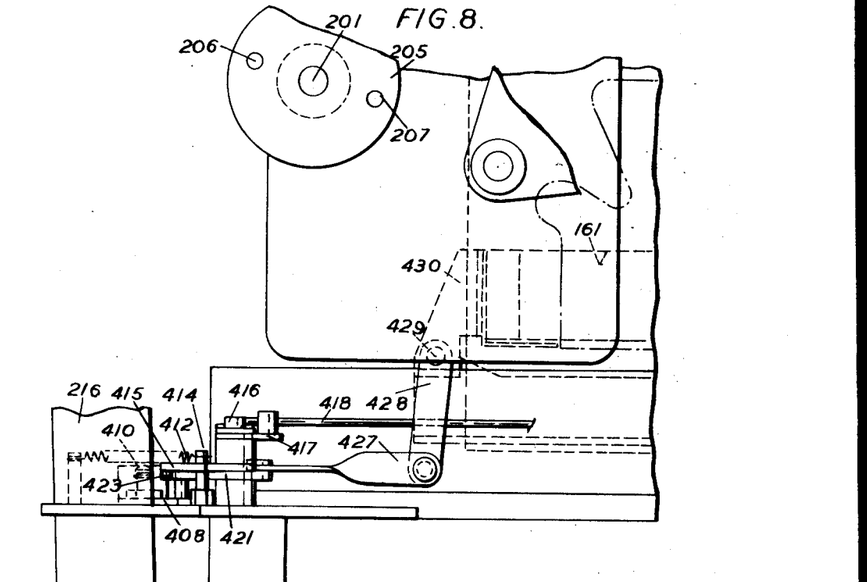
Figure 8 is a side elevation of control mechanism according to the present invention.

Each of the shutters 50 is provided with an individual latch 70, Figure 2B, and associated with each shutter latch 70 is a horizontal latch control slide 80, Figures 4 and 7, these slides being mounted inside a frame 81 attached to the forward face of the machine frame above the card magazine 8. At its forward end each control slide 80 is pivoted to a manually operable control plate 84 pivoted to a shaft 85 mounted in the frame 81 and carrying a handle 86 projecting through a slot 87 in a front plate 88, Figure 4. Each control plate 84 is formed with detent teeth 89 with which engages a spring detent 90 to locate the plate 84 in the position to which it has been set by the handle 86.

Each control slide 80 has a lug 93 on its upper edge and by manipulating the handles 86 each slide can be set individually to bring its lug into any one of five consecutive positions with relation to an actuating bail 94 which is common to all the slides 80.

Figure 5:
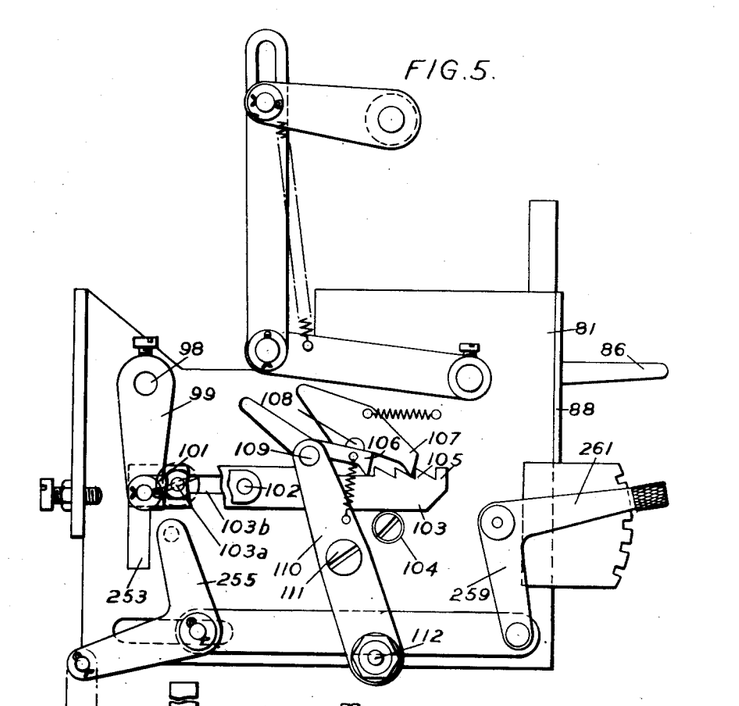
Figure 5 is a left-hand elevation of mechanism associated with that shown in Figure 4.
Figure 6:
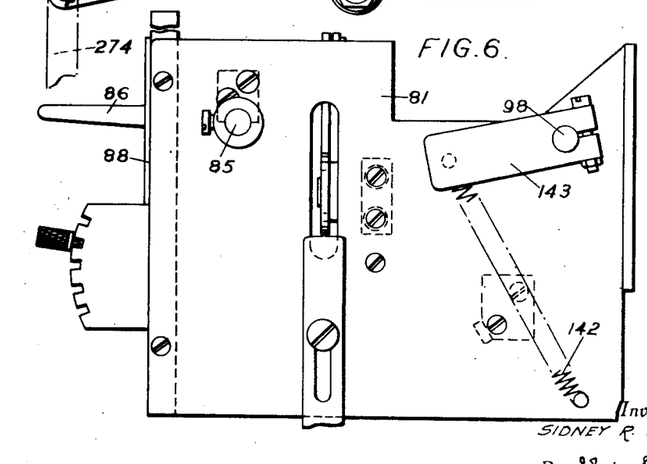
Figure 6 is a right-hand elevation of mechanism associated with that shown in Figure 4.

This bail 94 is bent in U-shape to form two arms 95, 95a which are pivoted at 96, 96a to arms 97, 97a secured to the shaft 98 freely mounted in the frame 81 and having secured to it outside the frame on the left-hand side, Figures 2A and 5, an operating arm 99 pivoted at its free end to a short link 101 which in turn is pivoted at 102 to a ratchet bar 103 freely supported at one end on a roller 104 rotatable on a fixed stud and carrying at its other end a pin 103a sliding in a slot 103b in the frame 81, Figure 5.

The ratchet bar 103 has four teeth 105 with which co-operate an actuating pawl 106 and a detent pawl 107, the latter being pivoted at 108 to frame 81 while the actuating pawl is pivoted at 109 on the upper end of a lever 110 pivoted to the frame 81 at 111, and pivoted at its lower end on a pin 112 which has a screw threaded end and is clamped by a nut to a horizontal link 114, Figure 2B, a slot 113 being provided for adjustment. The link 114 is pivoted at its rear end 115 to a bell crank plate 116 pivoted at 117 to a bracket 118 secured to the back of the main frame of the machine, said plate 116 being connected by a link 119 to a lever 120 pivoted to the base frame at 121 and carrying a roller 122 engaging in a cam track 123 formed in a disc secured to the main shaft 2.

Accordingly at each revolution of the main shaft 2 the cam 123 rocks the lever 120 counter-clockwise, Figure 2B, whereby link 114 is moved to the left thereby rocking lever 110 clockwise and causing pawl 106 to move the ratchet bar 103 forwardly one tooth space.

The movement of the ratchet bar 103 is transmitted through link 101 and arm 99 to shaft 98 which is accordingly rocked counter-clockwise in Figure 5 against a spring 142, Figure 7, attached to an arm 143 on shaft 98 thereby moving the bail 94 forwardly one step.

Thus, in successive revolutions of the main shaft 2 the bail 94 is advanced step by step from its normal or rearmost position to its foremost position, the maximum number of positions of the bail being five.

In each of the five positions which the bail 94 can occupy during the successive operations of the main shaft 2, the bail is depressed by the mechanism described in specification No. 2,496,-138 and when the bail has been advanced to its foremost position a total-taking cycle is initiated as described in that specification. Since, however, the present invention provides an additional control for the initiation of the total-taking cycle, the mechanism for effecting the operation of the total-taking shaft 235 will be described below.

In the upper part of the machine is an adding and printing mechanism including an adding and subtracting accumulator of the kind described in United Kingdom specification No. 405,666 or in United States specification No. 2,364,934.

As described in specification No. 2,496,138, the accumulator comprises denominational pairs of registering wheels 150, 151, Figure 2A, the wheels 150 being for addition and the wheels 151 being for subtraction. The wheels 150 and 151 are constantly in mesh with one another and are mounted in a cradle 154 which is the same as the cradle 21 described in United Kingdom specification No. 405,666. Associated with each pair of registering wheels 150 is a tooth actuating sector 155 pivoted to the machine frame at 156 and connected by a link 157 (equivalent to link 14 in United Kingdom specification No. 405,666) to a corresponding denominational type carrier 158 which is pivoted on a fixed shaft 159.

Each type carrier 158 is operated in the well-known manner by a corresponding toothed sector 160 also pivoted on the shaft 159. The sectors 160 are set from the stops of a stop basket 161 of which the construction is the same as that described in United States specification No. 2,242,095. The mechanism for effecting transmission of an item sensed by the sensing mechanism to the accumulator is the same as that described in United States specification No. 2,496,138 and includes an upper connection box 174 and an intermediate connection box 164 which is removable so that it can be replaced by another box when it is desired to change the connections between the pin box and the stop basket.

In order to control the engagement of the accumulator wheels 150 and 151 with the sectors 155 there is provided mechanism which comprises a link 193 pivoted at 194 to the cradle 154 and engaging at its lower end an eccentric 195 fixed to a shaft 196 on which is secured a pinion 197 engaging with a rack 198. The other end of the rack is pivoted at 199 to an arm 200 secured to a shaft 201. As described in United Kingdom specification No. 405,666 an abutment member 202 co-operates with the cradle 154 to determine whether the positive or negative wheels shall engage with the sectors 155.

In order to operate the shaft 201 the arm 200 has secured thereto a disc 205 carrying two pins 206, 207 co-operating respectively with slots 208, 209 in the head 210 of a vertical link 211, Figure 2A, of which the lower end is pivoted to the lever 120 which is actuated by the cam 123 to which reference has already been made.

The link 211 is operated in the manner described in specification No. 2,496,138 but in accordance with the present invention a trip device is provided to prevent engagement of the slot 209 with the pin 207 except during a total-taking cycle while permitting the ordinary co-operation between the slot 208 and pin 206. The trip device is arranged to be conditioned for operation by a manually settable second control plate movable by a handle to one or other of three predetermined positions one of which is a cut-out position which renders the trip device inactive.

When the trip device is rendered active by manipulation of the said second control plate it is operable as the result of signals received from the sensing pin box to control the extent of angular movement of the link 211 as will be described below.

As is described in British Patent No. 580,864 the total-taking shaft 235 is driven from the main shaft 2 by gears 266, 265a and 265, Figure 2B, of which the latter is freely mounted on the shaft 235 and carries three spring-loaded latches 267 co-operating with a clutch member 268 secured to the total-taking shaft 235. A clutch control lever 269 co-operates with the latches 267 and has its free end connected by a link 274, Figures 2B and 5, to a bell crank 255 so that when the bell crank is rocked by the lug 253 on the ratchet bar 103 the link 274 lifts the lever 269 clear of the latches 267 and one of the latches engages with the clutch member 268 and causes rotation of the total-taking shaft 235.

As stated above it is one object of the invention to provide means whereby a total-taking operation can be initiated from a total-taking control hole in a record card. To this end there is provided a manually settable link 401, Figures 1A and 1B, the upper end of which is guided for movement in a slotted plate 402 secured to the upper connection box 174 while the lower end of the link is connected to the clutch control lever 269, Figures 1B and 2B. The lower end of the link 401 is provided with a slot 403 which passes over the pin 404 by which the link 274 is connected to the control lever 269. Thus, the control lever 269 can be operated by the link 274 in the manner described in specification No. 2,496,138 independently of the operation thereof by the slotted link 401. When the control lever 269 is operated by the link 274 the pin 404 moves in the slot 403 in the link 401, but on operation of the slotted link 401, in the manner about to be described, the bottom of the slot 403 engages the pin 404 so that the control lever 269 is then raised by the link 401.

The upper end of the slotted link 401 is provided with a lateral projection 405 disposed over the top of the upper connection box 174 and to the upper end of the slotted link 401 is connected one end of a wire 406, the other end of which is connected to a manually operable setting lever 407. The setting lever 407 is movable to one or other of two positions and in one such position the wire 406 draws the slotted link 401 to an inactive position and in the other it pushes it to an active position where the lateral projection 405 thereon is disposed above a selected wire 176 in the upper connection box 174. When the slotted link 401 is set in its active position and a total-taking control hole is sensed in a card to effect operation of the wire 176 associated with the slotted link, the slotted link is raised by actuation of the wire 176 in the connection box thereby, as above described, lifting the slotted link 401 and raising the clutch control lever 269 to permit the total shaft 235 to be conditioned for a total-taking operation.

It will be understood that while the slotted link 401 is associated with one selected wire 176 in the connection box 174, this selected wire can, by the selective use of removable connection boxes 164, be connected for operation by any desired sensing pin 16 in the sensing pin-box according to the card field in which the total-taking control hole is punched.

When the slotted link 401 is conditioned for operation, the control arm 261 for the rack 103 may be moved to render the rack inactive and the slotted link is then operated each time a total-taking control hole is sensed in a card so that the total-taking operations are controlled entirely by total-taking control holes provided in the record cards being sensed.

It will be understood that the machine may be conditioned so that a total-taking cycle is initiated either by the rack 103 as described in specification No. 2,496,138, or by the slotted link 401, or both such devices may be conditioned to be active and thereby initiate total-taking operations at the appropriate times.

When the machine is conditioned for listing or tabulating operations, that is the machine is conditioned in a manner such that each card will be sensed once and an item printed by the machine in a single line, the items from successive cards being printed in successive lines one below the other, a total is usually desirable only at the end of a run of the machine or after a predetermined number of cards have been sensed. With listing operations, however, it is sometimes desired to print totals, hereinafter refered to as progressive totals, at intervals while continuing to add succeeding items into the accumulator until a final total is taken therefrom.

The machine described in specification No. 2,496,138 is so constructed that the accumulator is cleared or zeroised after each total-taking operation and the present invention provides mechanism whereby the accumulator may be cleared in the manner described in the aforesaid specification each time a total is taken, or the accumulator may be cleared only on receipt of a signal received as the result of the sensing of an accumulator clearing control hole formed in a record card.

To this end there is provided interrupter means for the link 211, the interrupter means when rendered active being arranged to prevent the link 211 from moving during a total cycle sufficiently to effect the clearing or zeroising of the accumulator.

The interrupter means consists of a sliding plate 408, Figures 1A and 8 to 10, having an abutment 409 movable into and out of the path of the link 211. The plate 408 is urged by a spring 410 into the path of the link 211 and latching means are provided to retain the plate 408 in an inactive position when it is desired to take a clearing total. The latching means comprises a pivoted element 411, which is urged by a spring 412 about its pivot 413 to latching position with respect to the abutment 409 on the plate 408 and a pin 414 extending laterally from the latch, and acting as an anchorage for the spring 412, is adapted to be engaged by a trip cam 415 mounted on a spindle 416 to which is secured an arm 417 having connected thereto a wire 418 the opposite end of which is attached to a manually settable control member 419, Figure 1A. When it is desired that the tripping device be rendered permanently inactive, as when the machine is to be operated for cross-adding in the manner described in specification No. 2,496,138 the trip cam 415 is moved by the settable control member 419 to a position at which a first cam face 420 thereon engages the pin 414 on the latch 411 and retains the latch 411 permanently in latching engagement with the abutment 409 on the sliding plate 408.

Freely mounted on the spindle 416 is a pawl 421 adapted to be engaged by a pin 422 extending laterally from the sliding plate 408. When the spindle 416 is rocked to move the trip cam 415 so that the first cam face 420 thereon engages the pin 414 on the latch 411 the pawl 421 is simultaneously rocked to move the sliding plate 408 so that the abutment 409 thereon is moved out of the path of the link 211 and the latch 411 is held out of latching engagement with the abutment 409 on the sliding plate 408. The movement of the pawl 421 is effected by a pin 423 which extends laterally from the trip cam 415, the pin 423 engaging a sloping face 426 on the pawl 421 and urging it against the pin 422.

Figure 9:
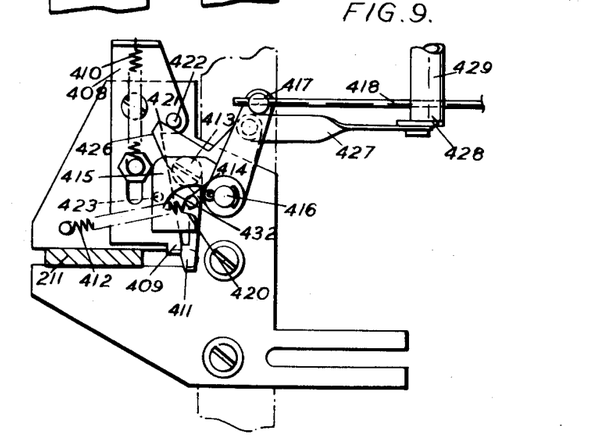
Figure 9 is a plan of Figure 8.
Figure 10:
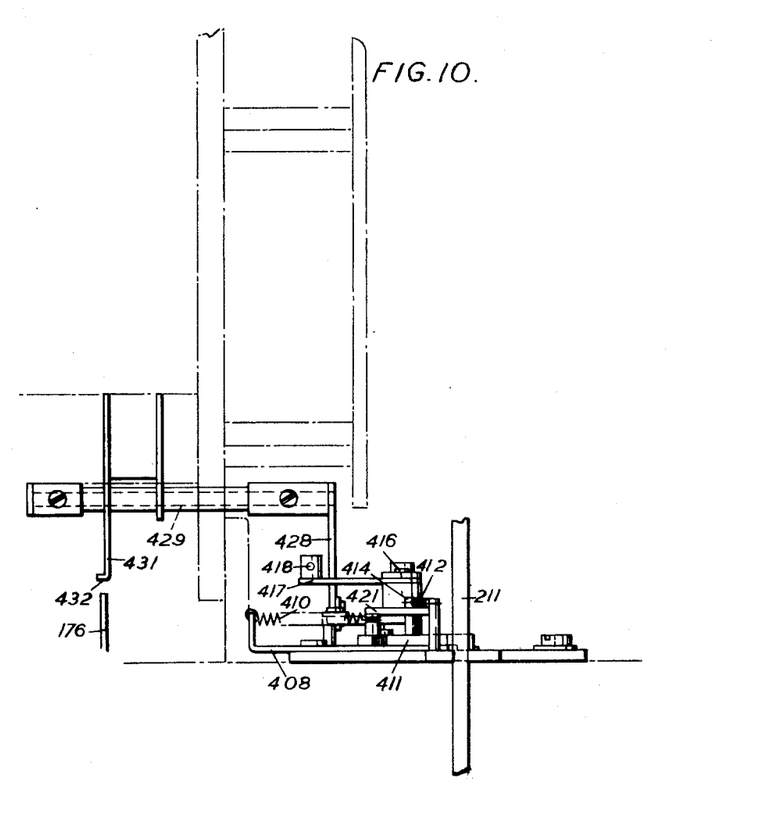
Figure 10 is an end view of Figure 8.

When the trip device is conditioned by the settable control member 419 to permit the machine to take progressive totals the trip cam 415 is moved to a neutral position, as shown in Figure 9, in which the pin 414 on the latch 411 is not engaged by the cam face 420 on the trip cam and the latch can be moved about its pivot 413, against the action of its spring 412, by the link 211 as about to be described. With the trip cam 415 set in this position, the pin 423 is out of agreement with the pawl 421 but the pin 422 on the sliding plate 408 is maintained in engagement with the pawl due to the action of the spring 410 which urges the sliding plate into the position in which the abutment 409 thereon is disposed in the path of the link 211. Connected to the pawl 421, which is of bell crank form, is a link 427 the opposite end of which is connected with a further link 428 secured to a spindle 429 carried in a bracket 430 mounted on the stop basket 161 of the machine. To the opposite end of the spindle 429 is secured a lever 431, Figure 10, one end 432 of which extends over a predetermined wire 176 in the upper connection box 174 and when this wire is actuated as a result of an accumulator clearing control hole being sensed in a card the wire is raised to effect rocking of the spindle 429 and to thus cause the pawl 421 so to be rocked about its pivot 416 that it raises the sliding plate 408 to a position at which the abutment 409 thereon is moved out of the path of the link 211. When this occurs the spring 412 controlling the latch 411 causes the latch to be moved into latching engagement with the abutment 409 so that the slide 408 is retained in its inactive position. As the link 211 is moved to the end of its forward stroke it disengages the latch 411 from the abutment 409 so that the slide 408, under the influence of its spring 410 is moved into endwise engagement with the side of the link 211 and on the return stroke of the link the abutment on the sliding plate is again moved into the path of the link 211.

With the trip device adapted for operation in the manner just described the lever 211, during listing cycles, is moved towards the abutment 409 during a total-taking cycle in which it is not desired to clear the accumulator and is arrested by the abutment so that the slot 209 in the head 210 does not engage with the pin 207, the head being arrested by the abutment in a position intermediate the pins 206 and 207. The link 211 is arrested in this manner each time the accumulator is not cleared during a total-taking operation but on the next total-taking operation, after the lever 431 has been raised by its associated wire 176 in the connection box, the abutment 409 on the slide 408 is latched out of the path of the link 211 in the manner just described so that the link 211 then makes its full stroke and the accumulator is cleared.

It is to be understood that if desired the accumulator clearing control hole which determines when the abutment is raised out of the path of the link 211 may be provided in the card which also contains a control hole to initiate a total cycle, or if desired the accumulator clearing control hole may be provided in a card preceding the card in which is provided a control hole to initiate a total-taking operation during which the accumulators are to be cleared.

When it is desired to condition the machine to ensure that progressive totals are taken continuously without interruption as the result of an accumulator clearing control hole being sensed in any particular card, the trip cam 415 is moved by the settable control member 419 to a third position at which the pin 414 extending laterally from the latch 411 is engaged by a second cam face 433 on the trip cam 415. With the pin 414 engaged by the said second cam face 433, the latch 411 is retained in a position such that it will be prevented from advancing into latching engagement with the abutment 409. Thus even if the abutment 409 on the sliding plate should, as a result of the sensing of an accumulator clearing control hole, be moved out of the path of the link 211, as it is not engaged by the latch 411, it is restored by its spring 410 to link arresting position before the link is moved to effect clearing of the accumulator.

As described in specification No. 2,496,138, when two or more fields are being sensed consecutively in a single card the card feed is interrupted while the card being sensed is retained in the sensing chamber and it is also necessary to interrupt the card feed during a total-taking cycle of the machine.

Figure 12:
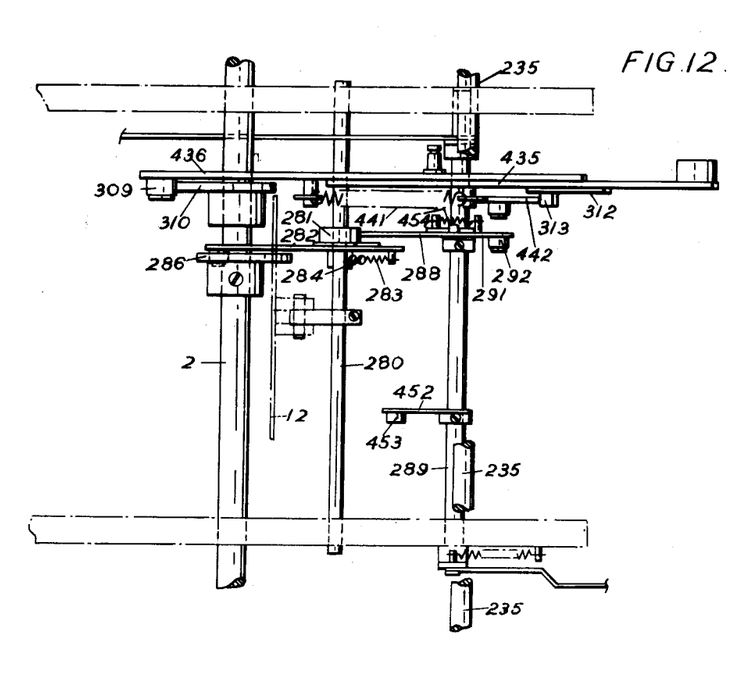
Figure 12 is a plan Figure 11.

In the machine according to the present invention the mechanism for interrupting the card feed is similar to that described in specification No. 2,496,138 but as there are differences of construction in the mechanism employed in a machine embodying the present invention this mechanism will now be described with reference to Figures 11 and 12.

The upper end of the card stop 12 which locates a card in sensing position is carried in guides, not shown, which keep it in its correct position and the card stop is actuated by a shaft 280 which is rocked by means of a bell crank having its lower arm 281 fixed to the shaft and its upper arm 282 freely mounted thereon. The two arms are sprung together by a spring 283 and their correct relative position is adjusted by a screw 284 and lock nut thereon. The arm 282 which is freely mounted on the shaft 280 carries a roller 285 to co-operate with a cam 286 secured to the main shaft 2 so that at each machine cycle the loosely mounted arm 282 is rocked by the cam.

Fixed to the lower end of the arm 281 is a pin 287 which co-operates with one arm 288 of a bell crank freely mounted on a spindle 289 carried in a frame bracket 290. The upper arm 291 of this bell crank carries a roller 292 co-operating with a cam 293 on the total shaft 235, the roller being maintained in contact with the cam by a spring 433 which is connected to an arm 434 secured to the spindle 289.

With this arrangement although the arm 282 is rocked at each machine cycle the bell crank arm 288 which is loosely mounted on the spindle 289, by standing in the path of the pin 287, prevents movement of the arm 281 so that the shaft 280 is not rocked and accordingly the card stop 12 remains closed.

When the total shaft 235, which is a single revolution shaft, commences to make its one revolution the cam 293 rocks the bell crank 291 thereby removing the arm 288 from engagement with the pin 287 so that at the next revolution of the main shaft 2 the rocking of the arm 282 effects operation of the shaft 280 so that the card stop moves down to open position thereby releasing the card.

It may here be pointed out that the total shaft starts to rotate while the pin box is in its lowermost position sensing the card and that the cam 293 rocks the arm 291 immediately so that, as the pin box rises to transmit the sensed data to the stops, so the card stop is opened to release the sensed card. The cam 293 has a relatively short dwell and therefore the arm 288 returns to latch the pin 287 after one movement of the card stop.

The card picker is carried on a casting 300, Figure 3, mounted in the usual manner to slide to and fro in the magazine from which cards are to be fed and is actuated by a pair of arms 302 each connected by a link 303 to the front end of the casting 300. The arms 302 are secured to a shaft 304 to which is fixed an operating arm 305 having pivoted thereto a composite link which has a fork 367 at its other end to pass over the main shaft 2 and the link carries a roller 309 to co-operate with a cam 310 secured to the main shaft. The composite link is formed by two members 435, 436 sliding one against the other, the member 435 being provided with pins 437, 438 which extend laterally therefrom through slots 439, 440 formed in the member 436. The members 435, 436 are connected by a pair of springs 441 which permit relative movement between the two members forming the composite link. A return spring 311 is provided to return the link after actuation thereof by the cam 310 on the main shaft 2. Fixed to the link member 435 which is connected to the operating arm 305 is a bracket 312 carrying a lateral projection 313 and on the spindle 289 is loosely mounted an arm 442 which when the machine is set for a cross adding operation as described in specification No. 2,496,138 normally stands in the path of the lateral projection 313.

To permit the machine to be conditioned for listing operations during which it is desired that the card feeding mechanism be rendered active until a total-taking cycle is initiated by card control as above described there is provided mechanism about to be described.

A manually operable setting member 443, Figure 1A, is pivotally mounted at the front of the machine and has connected thereto one end of a long link 444, Figure 1B, which extends downwards to the base of the machine. The lower end of the link is provided with a slot 445 which passes over a pin 446 extending horizontally from a bracket 447 secured to the bed of the machine. Also provided at the lower end of the link is a cam face 448 to engage with a cam follower 449 on a trip member 450 which is connected to an arm 451 secured to the spindle 289. Also secured to the spindle 289, Figure 11, is an arm 452 supporting a cam follower 453, this arm 452 being connected with the bell crank 291 through the medium of the spring 433 and a lateral pin 454 on the bell crank 291, the latter being thereby adapted to be urged towards the arms 452 carrying the cam follower 453 so that it is coupled thereto.

When the manually settable member 443 is moved to render inoperative the interrupting mechanism for the card feeding device the trip member 450 is caused to move under the influence of a spring 455 so that the spindle 289 is rocked to a position at which the arm 452 is moved to bring the cam follower 453 into engagement with a cam 456 on the total shaft 235. Movement of the spindle 289 also moves the arm 442 and the bell crank 288 which are loosely mounted on the spindle 289 so that they no longer engage the abutments 287, 313 association with which prevents actuation of the picker for the feeding mechanism and of the card stop. Accordingly with the trip member 450 in the position just described the picker will operate to feed a card from the magazine at each cycle of the main shaft and the card stop will also be raised and lowered at each such cycle. On a total-taking cycle, however, the cam 456 rocks the arm 452 thereby rocking the spindle 289 so that the loosely mounted arm 442 and the bell crank 288 are again temporarily restored to the position at which they are engaged with their associated abutments to render inactive the picker for the feeding mechanism and the card stop. At the end of the total cycle the parts are returned to the positions just described to permit the continued feeding action of the picker and operation of the card stop at each cycle of the main shaft.

In the foregoing, the invention has been described as applied to the machine described in specification No. 2,496,138 it will, however, be understood by those skilled in the art that the control devices according to the invention can be applied to other record card controlled statistical machines, such as tabulators, which employ an accumulator and connection boxes for transmitting to the accumulator items sensed from record cards.

I claim:

1. A record card controlled statistical machine including the combination with a reciprocating pin box for sensing record cards, an accumulator, transmission means including a connection box containing transmission elements actuated by the pins of the pin box to transmit to said accumulator items sensed by pins of the pin box for accumulation in the accumulator, and means to initiate the operation of a total-taking shaft to effect the taking of a total from the accumulator, of selectively operable control means adapted for actuation by a selected one of said transmission elements on the sensing of a total-taking control hole in a record card to initiate a cycle of the total-taking shaft.

2. A machine according to claim 1 and having means operative during a total-taking cycle of the machine to zeroise the accumulator, including interrupter means to prevent the actuation of said zeroising means during a total-taking cycle, and a trip device operable as the result of a signal received from said pin box to condition the interrupter means to permit zeroising of the accumulator during the total-taking cycle next succeeding the conditioning of the interrupter means.

3. A machine according to claim 2, in which the means for initiating the operation of the total-taking shaft includes a clutch member on the shaft and a control lever therefor, wherein the selectively operable control means comprises a manually settable link connected at one end through a lost motion device with the control lever and a lateral projection movable with the settable link into and out of the path of a predetermined transmission element in said connection box whereby when the projection is positioned for and is engaged by the transmission element the settable link is moved by the transmission element to operate the control lever to initiate a cycle of the total-taking shaft and when the projection is positioned so as to be not engaged by the said transmission element the control lever can function independently of the settable link.

4. A machine according to claim 3, wherein the portion of the settable link provided with said lateral projection is guided for movement relative to its associated transmission element by a slotted plate and is connected by a rigid member with a manually operable setting lever.

5. A machine according to claim 4 in which the zeroising means includes an oscillatory link to initiate a zeroising operation, wherein the interrupter means comprises an abutment movable into and out of the path of the oscillatory link under spring control and the trip device comprises a pivoted pawl to engage a pin extending laterally from a sliding plate from which said abutment projects, and linkage operable by a predetermined transmission element when a sensing pin associated therewith senses a control hole in a record card.

6. A machine according to claim 5, wherein a latch is urged by a spring to a position at which it will hold the abutment out of the path of the oscillatory link.

7. A machine according to claim 6, wherein a manually settable trip cam is arranged to condition the pawl and the latch for operation.

8. A machine according to claim 7, wherein the trip cam is settable by a rigid member and a control member movable to predetermined positions to effect setting of the trip cam in any of three positions, one of said positions being a mutual position in which, for the purpose of progressive total-taking, the sliding plate is rendered inactive by the linkage operating the pawl as the result of the sensing of a control hole in a record card and is again rendered active on the next operation of the oscillatory link, a second position being one in which a first cam face on the trip cam co-operates with a lateral pin on the latch and a pin extending laterally from the trip cam co-operates with the pawl to render both the latch and the sliding plate inactive, and the third position being one in which a second cam face on the trip cam co-operates with said pin on the latch to render the latch permanently inactive.

9. A machine according to claim 8 and having a card feeding picker and mechanism tending to actuate said picker at each sensing operation, a latch normally holding said picker inoperative, and means operative under the control of the total shaft to render said latch ineffective, characterised in that a manually operable setting member is provided to condition the machine for listing operations during which it is desired that the card feeding picker be rendered inactive until a total-taking cycle is initiated by card control.

10. A machine according to claim 9, wherein the manually operable setting member is connected with a rockable spindle under control of the total shaft for operating the latch for the picker by a link having a cam face to engage with a cam follower on a trip member attached to an arm secured to the rockable spindle for angular movement therewith, and a cam follower arm is secured to the rockable spindle for operation by a cam to effect release of the latch on a total-taking cycle initiated by card control.

SIDNEY ROBERT HAINES.

No references cited.